(12) United States Patent
Baker (10) Patent No.: US 9,908,408 B2
(45) Date of Patent: Mar. 6, 2018

(54) BRAKE SYSTEM DIG FEATURE

(71) Applicant: Continental Automotive Systems, Inc., Auburn Hills, MI (US)

(72) Inventor: David Leigh Baker, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 26 days.

(21) Appl. No.: 15/228,053

(22) Filed: Aug. 4, 2016

(65) Prior Publication Data

US 2017/0174078 A1   Jun. 22, 2017

Related U.S. Application Data

(60) Provisional application No. 62/269,157, filed on Dec. 18, 2015.

(51) Int. Cl.
| B60K 17/344 | (2006.01) |
|---|---|
| B60T 10/02 | (2006.01) |
| B60T 1/02 | (2006.01) |
| B60K 23/08 | (2006.01) |

(52) U.S. Cl.
CPC ............ *B60K 17/344* (2013.01); *B60K 23/08* (2013.01); *B60T 1/02* (2013.01); *B60T 10/02* (2013.01)

(58) Field of Classification Search
CPC ......... B60K 17/344; B60K 23/08; B60T 1/02; B60T 10/02
See application file for complete search history.

(56) References Cited

FOREIGN PATENT DOCUMENTS

| DE | 4224887 A1 | 9/1993 |
|---|---|---|
| EP | 2151361 A2 | 2/2010 |
| GB | 252253 A | 5/1926 |

OTHER PUBLICATIONS

Rebel2345, Jul. 30, 2009, "What is a front dig?" Great Lakes 4X4.com, /showthread.php?p= 1788416 Accessed May 27, 2017. See whole discussion especially 02.08 PM.
Harry Wagner, May 1, 2011, "Take your crawling to the next level", How to, http://www.fourwheeler.com/how-to/154-1105-take-yourcrawling-to-the-next-level/ accessed May 27, 2017. See "front dig".
Search Report of the Great Britain Intellectual Property Office dated Jun. 5, 2017 for corresponding Great Britain application No. GB1621194.8.

*Primary Examiner* — Kevin Hurley
*Assistant Examiner* — Gabriela C Craciun (57) ABSTRACT

A dig system which allows for a vehicle to perform a dig maneuver, without sacrificing drivability. An actuator places the dig system in one of four different modes of operation, where the front wheels are placed in either a first configuration or a second configuration, where the front wheels are positioned at a desired steering angle, and one of the front or rear wheels is braked and prevented from rotating. The transfer case transfers power to one or more of the non-braked wheels, and disconnects from the remaining wheels. One or more of the non-braked wheels are rotated such that the vehicle pivots about an axis which extends through one of the wheels. One of the rear wheels is braked when performing a front dig maneuver, and one of the front wheels is be braked when performing a reverse dig maneuver.

18 Claims, 4 Drawing Sheets

BRAKE SYSTEM DIG FEATURE

CROSS-REFERENCE TO RELATED APPLICATIONS

This application claims the benefit of U.S. Provisional Application No. 62/269,157 filed Dec. 18, 2015. The disclosure of the above application is incorporated herein by reference.

FIELD OF THE INVENTION

The invention relates generally to a dig system for a four-wheel drive vehicle, which allows the vehicle to maneuver a turn or change direction by performing a front dig maneuver or a reverse dig maneuver.

BACKGROUND OF THE INVENTION

There are many different types of vehicles which are taken off-roading for recreational use. Many of these vehicles have various features to prevent the vehicle from being limited in off-road travel, and increase capability to maneuver through difficult terrain.

Some vehicles are manufactured specifically for the purpose of off-road driving, while some vehicle owners make modifications to their vehicle to improve the vehicle's off-road capability. On some off-road trails, it may difficult to maneuver exceedingly tight turns. The width and accessibility of various off-road trails is often very different when compared to a two-lane road. Some turns and other maneuvers require the use of the reverse gear and one or more forward gears such that the vehicle is moved forward and reverse several times to change the position of the vehicle, and thereby allowing the vehicle to continue onward through the trail. Many off-road enthusiasts do not prefer to maneuver through trails in this manner, but prefer to have a vehicle with increased maneuverability. To avoid changing between the forward gears and the reverse gear several times when performing a turning maneuver, some owners of off-road vehicles modify their vehicles such that the vehicle may turn and change position without the use of the reverse gear, essentially performing a maneuver referred to as a "front dig." If the proper modifications are made, the vehicle is able to perform a front dig, and is not required to use the reverse gear to complete the turn. A front dig maneuver involves the driver disconnecting the rear axle output at the transfer case, either through the use of pneumatics, or mechanically. The driver of the vehicle then applies the brakes such that braking pressure is applied to the rear axle only, the vehicle is steered in the desired direction, and the driver then applies the accelerator pedal. With the rear axle disconnected, all of the output of the engine is sent to the front axle, which causes the front wheels to rotate and pull the vehicle in the desired direction. With brake pressure applied to the rear wheels only, the rear wheels do not roll, and the vehicle pivots about the rear axle. This allows the driver to perform extremely tight turns without the use of the reverse gear in the transmission.

With current production vehicles, modifications to the transfer case and brakes are needed to enable the vehicle to complete a front dig maneuver. The transfer case splits the output of the engine between the front axle and rear axle. Some transfer cases have the ability to disconnect output to either the front axle or rear axle using a selection lever located in the interior of the vehicle. If the transfer case of the vehicle does not have this capability, it is common for an additional tail housing to be installed between the transfer case and the rear differential. The additional tail housing may be equipped with a selection lever, or utilize air pressure to disconnect the rear output, allowing for control of the distribution of power to the front wheels or rear wheels.

The needed modification to the braking system involves replacing the stock brake master cylinder with twin master cylinders, and replacing the pedal assembly with two brake pedals. When the twin master cylinders are used, one master cylinder is plumbed to the rear axle brakes and the other master cylinder is plumbed to the front brakes. The EBS also includes a pump, valves, and an electronic controller. The EBS is connected to each brake via brake lines. At any time, the EBS controls the valves to maintain, dump, or build pressure at any wheel.

However, incorporating these types of modifications into a vehicle may also alter or change the drivability of the vehicle in a negative manner.

Accordingly, there exists a need for a system that is incorporated into a vehicle during the manufacturing process, which allows the vehicle to perform a dig maneuver, without sacrificing vehicle drivability.

SUMMARY OF THE INVENTION

The present invention is a dig system which allows for a vehicle to perform a front dig maneuver, or rear dig maneuver, without sacrificing the drivability of the vehicle.

In one embodiment, the present invention is a dig system for a vehicle, including a first front wheel and a second front wheel connected to a front axle, a first rear wheel and a second rear wheel connected to a rear axle, and a transfer case for distributing power between the front axle and the rear axle.

The dig system also includes a first front brake unit operable for preventing rotation of the first front wheel, a second front brake unit operable for preventing rotation of the second front wheel, a first rear brake unit operable for preventing rotation of the first rear wheel, and a second rear brake unit operable for preventing rotation of the second rear wheel. A hydraulic control unit is operable for controlling the first front brake unit, the second front brake unit, the first rear brake unit, and the second rear brake unit. A first axis extends through the first rear wheel, a second axis extending through the second rear wheel, a third axis extends through the first front wheel, and a fourth axis extends through the second front wheel.

An actuator is operable for placing the dig system in a first mode of operation, a second mode of operation, a third mode of operation, and a fourth mode of operation.

During the first mode of operation, the first front wheel and the second front wheel are placed in a first configuration, the hydraulic control unit releases the first front brake unit, the second front brake unit, and the first rear brake unit, and maintains the actuation of the second rear brake unit such that the second rear wheel is prevented from rotating. The transfer case is configured to transfer power to the first front wheel and the second front wheel, is disconnected from the first rear wheel and the second rear wheel, such that when the first front wheel and second front wheel are rotated by the transfer case, the vehicle pivots about the second axis.

During the second mode of operation, the first front wheel and second front wheel are placed in a second configuration, the hydraulic control unit releases the first front brake unit, the second front brake unit, and the second rear brake unit, and maintains the actuation of the first rear brake unit such that the first rear wheel is prevented from rotating. The transfer case is configured to transfer power to the first front wheel and the second front wheel, and is disconnected from the first rear wheel and the second rear wheel, such that when the first front wheel and second front wheel are rotated by the transfer case, the vehicle pivots about the first axis.

During the third mode of operation, the first front wheel and the second front wheel are placed in the first configuration, the transfer case is configured to transfer power to the first rear wheel and the second rear wheel, and disconnect from the first front wheel and the second front wheel. The braking system is configured to prevent rotation of the second front wheel, such that when the first rear wheel and the second rear wheel are rotated by the transfer case, the vehicle pivots about the fourth axis.

During the fourth mode of operation, the first front wheel and the second front wheel are placed in the second configuration, the transfer case is configured to transfer power to the first rear wheel and the second rear wheel, and disconnect from the first front wheel and the second front wheel. The braking system is configured to prevent rotation of first front wheel, such that when the first rear wheel and the second rear wheel are rotated by the transfer case, the vehicle pivots about the third axis extending through the first front wheel.

The dig system of the present invention also includes an actuator for controlling the operation of the dig system. The actuator is used to configure the dig system in either of the first mode of operation, the second mode of operation, the third mode of operation, or the fourth mode of operation The first rear bake unit and the second rear brake unit may be the brake units used to stop the vehicle when driving, or in other embodiments, the first rear brake unit and the second rear brake unit may be parking brake units, used to perform the front dig maneuver, where the parking brake units are controlled directly by the ECU of the vehicle.

When the first front wheel and the second front wheel are placed in either the first configuration or the second configuration, both the first front wheel and the second front wheel are positioned at a desired steering angle to direct the vehicle in a desired direction as the dig maneuver is performed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
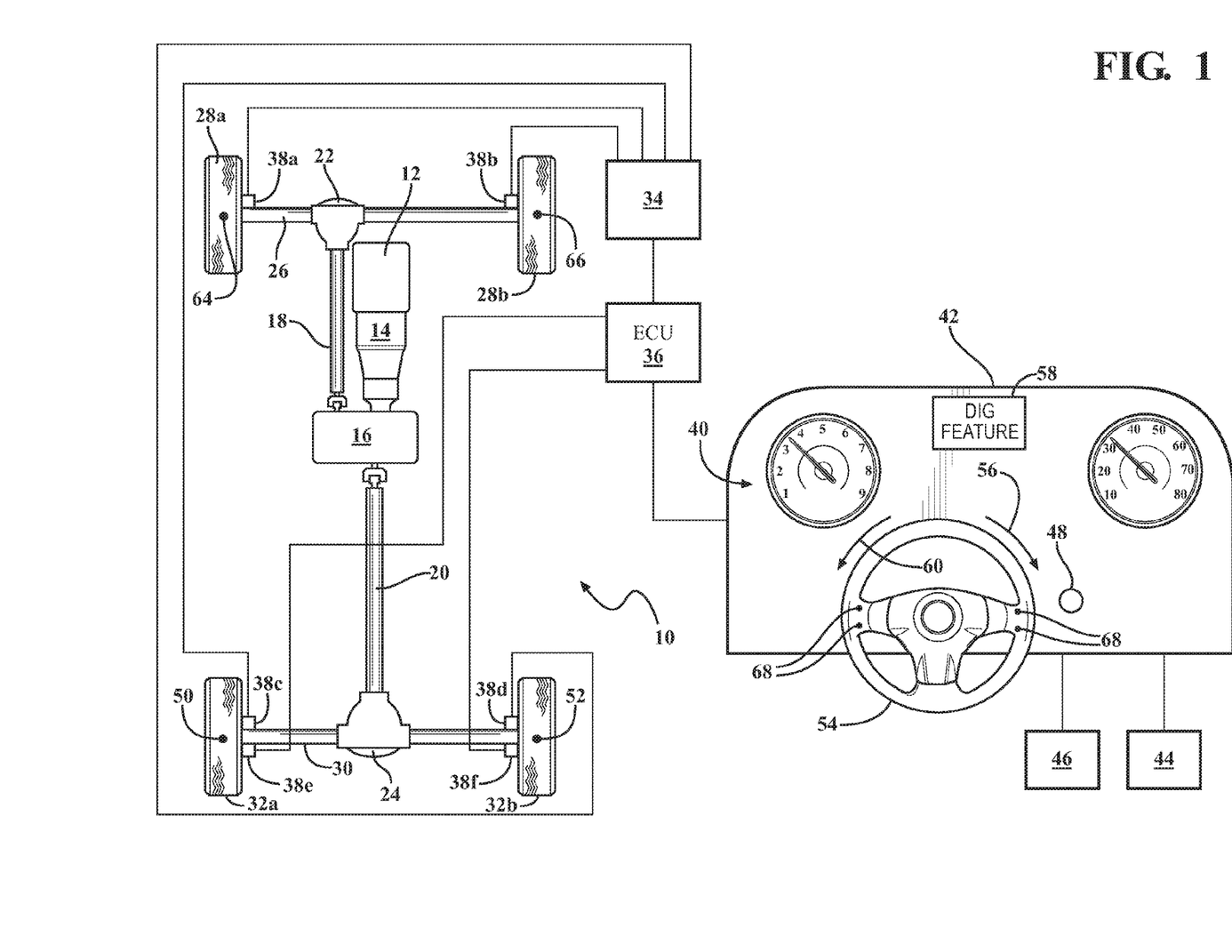
FIG. 1 is a diagram of a top view of the powertrain system of a vehicle having a dig system, according to embodiments of the present invention.

A diagram of part of a vehicle incorporating a dig system according to the present invention is shown in FIG. 1, generally at 10. The vehicle 10 includes an engine 12 connected to a transmission 14, and a transfer case 16 connected to the transmission 14. The transfer case 16 controls the power transfer from the engine 12 between a front drive shaft 18, and rear drive shaft 20. The front drive shaft 18 is connected to a front differential 22, and the rear drive shaft 20 is connected to a rear differential 24. The front differential 22 is connected to a front axle 26, which transfers power to a first front wheel 28a and a second front wheel 28b. The rear differential 24 is connected to a rear axle 30, and the rear axle 30 is connected to and transfers powers to a first rear wheel 32a and a second rear wheel 32b.

The vehicle 10 also includes a brake system, where the brake system includes a hydraulic control unit 34 in electrical communication with an electronic control unit (ECU) 36. There are several brake units in communication with the hydraulic control unit 34. There is a first front brake unit 38a which applies braking force to the first front wheel 28a, a second front brake unit 38b which applies braking force to the second front wheel 28b, a first rear brake unit 38c which applies for to the first rear wheel 32a, and a second rear brake unit 38d which applies force to the second rear wheel 32b. There is also a first parking brake unit 38e which applies braking force to the first rear wheel 32a, and a second parking brake unit 38f which applies braking force to the second rear wheel 32b. Each of the parking brake units 38e,38f is controlled directly by the ECU 36.

The ECU 36 is in electrical communication with an instrument cluster, shown generally at 40, which is part of a dashboard 42 of the vehicle 10. The instrument cluster 40 may include several different gauges, such as a speedometer, tachometer, fuel gauge, temp gauge, and the like. The ECU 36 communicates to the instrument cluster 40 various information about the vehicle 10, such as engine rpm, vehicle speed, engine temperature, and the like, such that the driver is aware of how the vehicle 10 is operating. There is also an accelerator pedal 44 and a brake pedal 46 which are positioned relative to the instrument cluster 40.

The instrument cluster 40 also includes an actuator, such as a button 48 located on the instrument cluster 40, buttons 68 on a steering wheel 54, or other type of actuator which is used with an interface to activate and control the operation of the dig system of the present invention. The dig system is used to rotate the vehicle 10 about a first axis 50, a second axis 52, a third axis 64, or a fourth axis 66, depending on the mode of operation of the dig system. The interface may be a screen 58, such as a driver information center, which is used to provide warnings and notifications about the various operating conditions of the vehicle 10. The screen 58 is part of the instrument cluster 40, where the screen 58 may function as an indicator as part of the dig system, to indicate to the driver of the vehicle 10 that the dig system is active, as well as in which mode of operation the dig system is presently operating.

Figure 2:
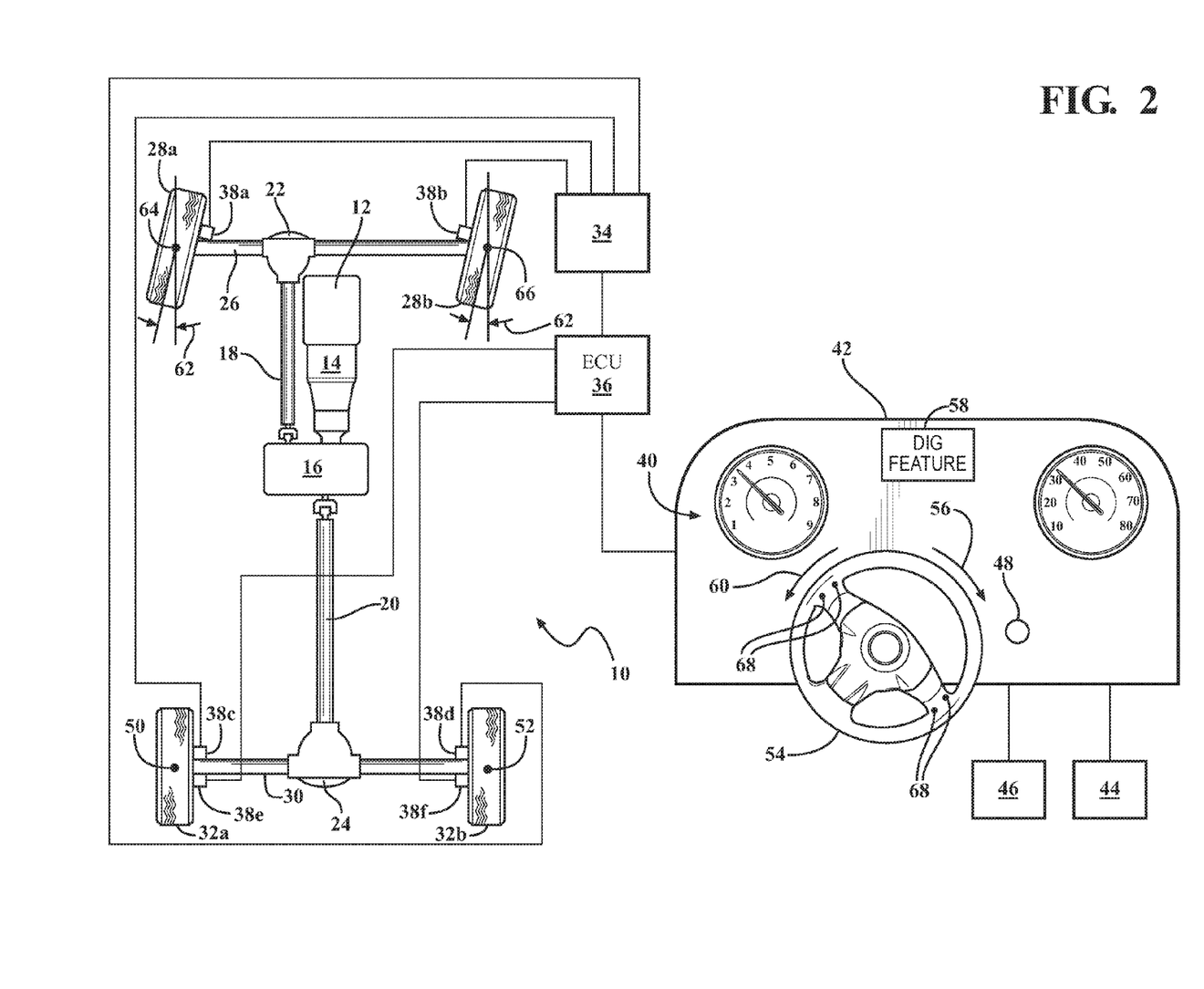
FIG. 2 is a diagram of a top view of the powertrain system of a vehicle having a dig system, with the front wheels placed in a first configuration, according to embodiments of the present invention.
Figure 3:
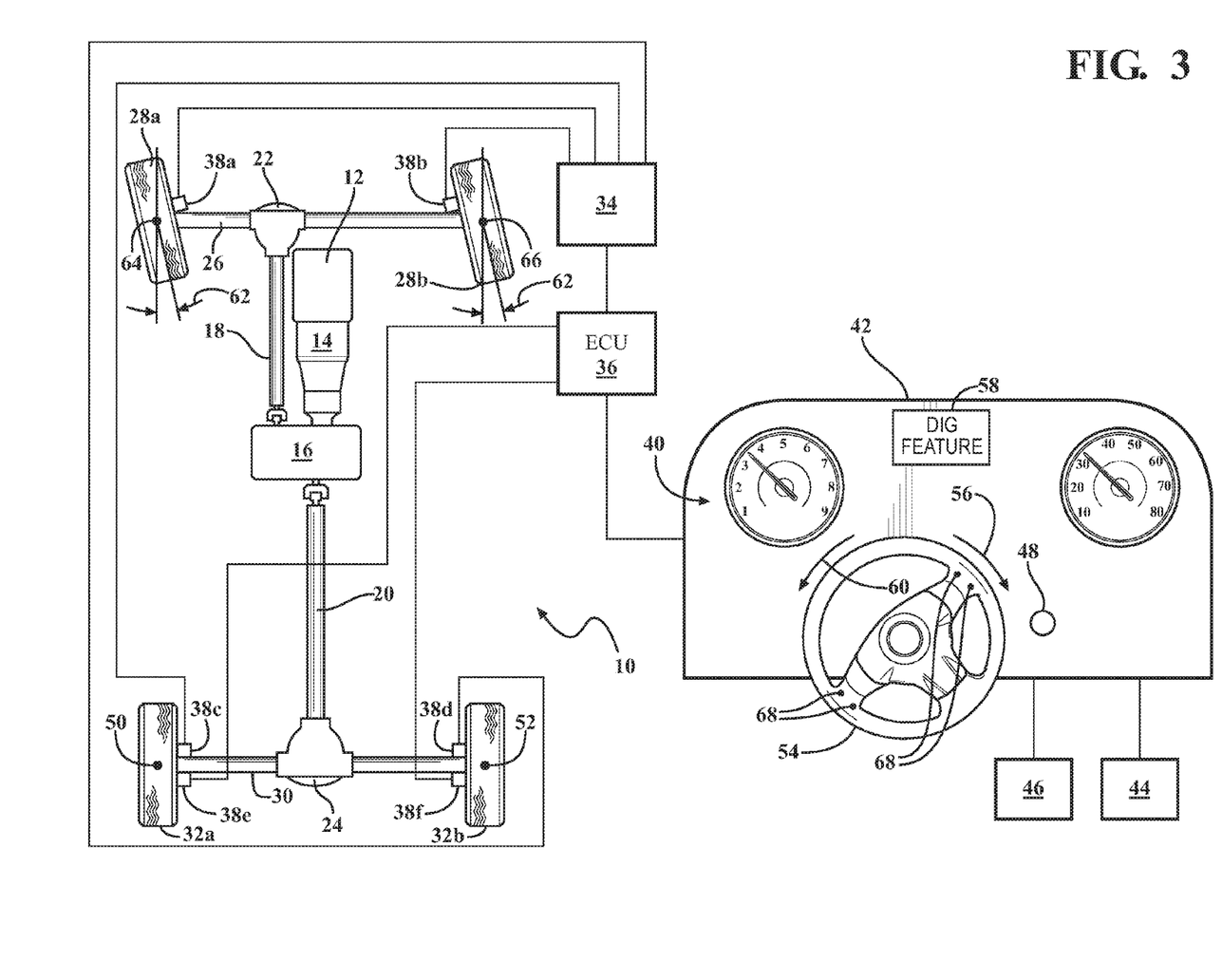
FIG. 3 is a diagram of a top view of the powertrain system of a vehicle having a dig system, with the front wheels placed in a second configuration, according to embodiments of the present invention.
Figure 4:
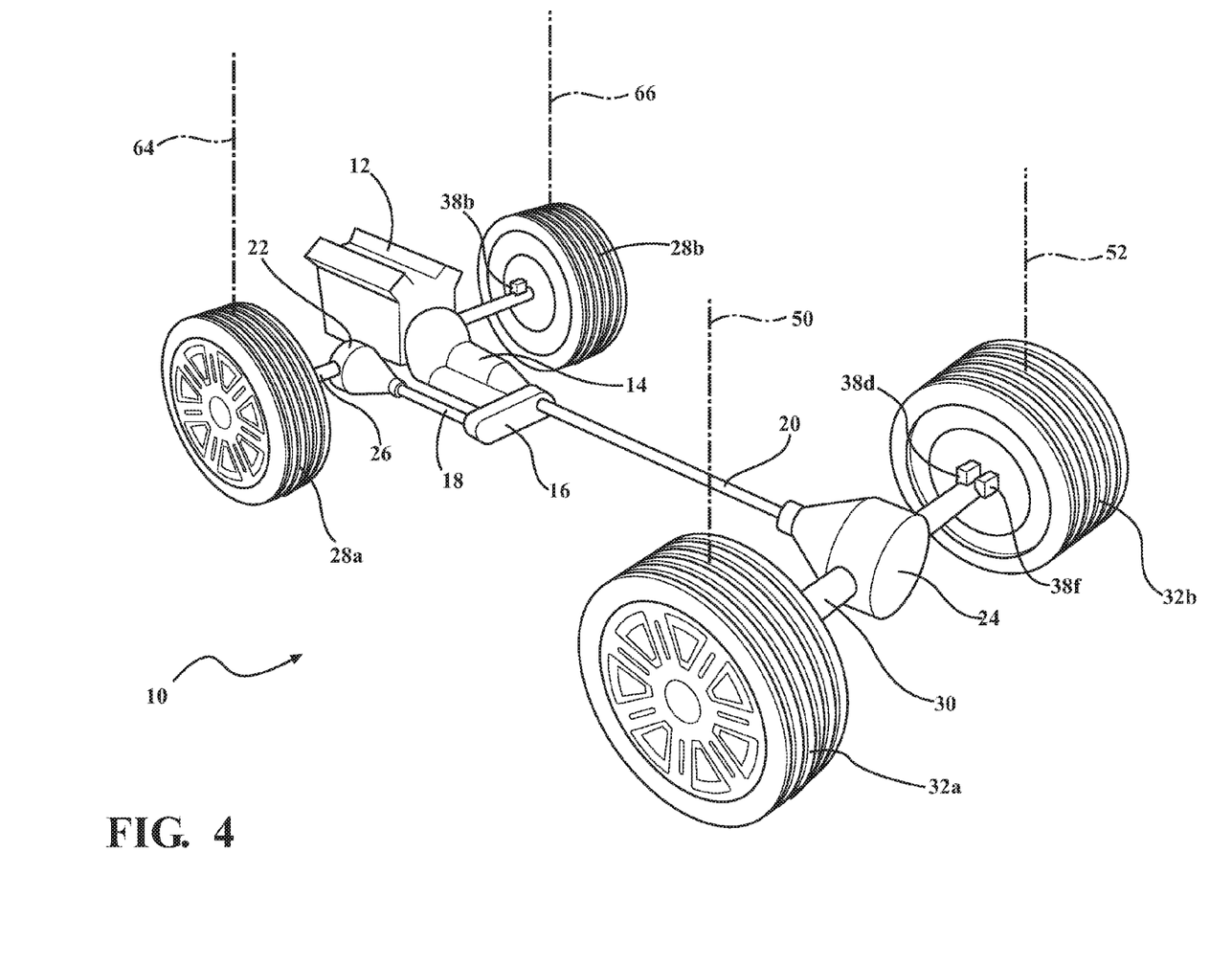
FIG. 4 is diagram of a perspective view of the powertrain system of a vehicle having a dig system, according to embodiments of the present invention.

The movement of the front wheels 28a,28b during normal driving operation is controlled by the steering wheel 54. The steering wheel 54 is rotated in a first direction, as indicated by arrow 56, which causes the front wheels 28a,28b to turn right, as shown in FIG. 2, or a second direction, as indicated by arrow 60, which causes the front wheels 28a,28b to turn left, as shown in FIG. 3. The degree which the front wheels 28a,28b are pivoted to steer the vehicle is the steering angle 62. The steering angle 62 may be negative, as shown in FIG. 2, or positive, as shown in FIG. 3. The steering angle 62 may also be controlled by the dig system, were the driver of the vehicle 10 may activate the dig system, and command the front wheels 28a,28b to be placed at a specific steering angle 62 to perform a dig maneuver, where, along with the current active mode of operation, the steering angle 62, and which of the brake units 38a,38b,38c,38d,38e,38f are active and inactive, may be shown on part of the screen 58.

The dig system may be placed in two different modes of operation to perform a front dig. In the first mode of operation, the accelerator pedal 44 is released, the brake pedal 46 is applied such that the vehicle 10 is not moving, and the driver of the vehicle 10 activates the dig system by pressing one of the buttons 48,68, or other type of actuator. Once the dig system is activated, the front brake units 38a,38b and either the rear brake units 38c,38d or the parking brake units 38e,38f remain activated such that each of the wheels 28a,28b,32a,32b is prevented from rotating. The brake units 38a,38b,38c,38d, may remain activated when the driver of the vehicle 10 continues to press the brake pedal 46, such that the hydraulic control unit 34 actuates each of the brake units 38a,38b,38c,38d, or any combination of the brake units 38a,38b,38c,38d,38e,38f may remain activated automatically, where the ECU 36 actuates the parking brake units 38e,38f, or the ECU 36 commands the hydraulic control unit 34 to continue to actuate one or more of the brake units 38a,38b,38c,38d once the dig system is activated (eliminating the need for the driver to continue to press the brake pedal 46).

The front wheels 28a,28b are then placed in a first configuration, as shown in FIG. 2, where the front wheels 28a,28b are turned to the right, and are positioned at a specified steering angle 62 commanded by the driver of the vehicle 10, either by rotating the steering wheel 54 in the first direction 56, or when the driver of the vehicle 10 activates the dig system and a specific command is received from the driver of the vehicle 10 to place the front wheels 28a,28b in the first configuration (eliminating the need to rotate the steering wheel 54).

The ECU 36 then detects the wheels 28a,28b are in the first configuration, and configures the transfer case 16 such that power is no longer transferred to the rear wheels 32a,32b, and power from the engine 12 transferred only to the front wheels 28a,28b. The driver of the vehicle 10 is then notified by the indicator 58 that the dig system is active, and (if the brake pedal 46 has been applied) the brake pedal 46 is then to be released. After the front wheels 28a,28b have been placed in the first configuration, the ECU 36 commands the hydraulic control unit 34 to release three of the brake units 38a,38b, and 38c (or 38e, depending on which of the brake units 38c or 38e were activated), and maintains the activation of the second rear brake unit 38d (or parking brake unit 38f) such that the second rear wheel 32b is still prevented from rotating.

Once the second rear brake unit 38d (or the parking brake unit 38f) is the only brake unit activated, the driver of the vehicle 10 then presses the accelerator pedal 44 such that power is transferred to the front wheels 28a,28b, causing the front wheels 28a,28b to rotate. The rotation of the front wheels 28a,28b rotates the vehicle 10 about the second axis 52, allowing the vehicle 10 to change direction without having to perform a back up or reverse maneuver. The amount the vehicle 10 pivots about the second axis 52 depends upon how long the driver of the vehicle 10 presses the accelerator pedal 44, and the steering angle 62 of the front wheels 28a,28b. If the driver of the vehicle 10 is aggressive, and the front wheels 28a,28b are rotated at a high rate of speed, the vehicle 10 may not only pivot about the axis 52, but also move across the ground such that the second rear wheel 32b slides across the ground, as the remaining wheels 28a,28b,32a rotate because of the front wheels 28a,28b being driven by the transfer case 16 and the first rear wheel 32a being allowed to rotate free. Once the desired amount of rotation about the second axis 52 is achieved, the accelerator pedal 44 is released, such that the vehicle 10 stops rotating about the axis 52. The driver of the vehicle 10 then deactivates the dig system by again pressing the button 48 (or buttons 68), or touches the brake pedal 46, where the ECU 36 then commands the hydraulic control unit 34 to release the second rear brake unit 38d (or the ECU 36 directly releases the parking brake unit 38f), such that all of the brake units 38a,38b,38c,38d,38e,38f return to functioning as expected when the dig system is inactive, and the transfer case 16 is configured such that the transfer case 16 is transfers power to all four wheels 28a,28b,32a,32b.

In the second mode of operation, the accelerator pedal 44 is again released, the brake pedal 46 is applied such that the vehicle 10 is not moving, and the driver of the vehicle 10 activates the dig system by pressing the button 48 (or buttons 68). Once the dig system is activated, the front brake units 38a,38b and either the rear brake units 38c,38d or the parking brake units 38e,38f remain activated such that each of the wheels 28a,28b,32a,32b is prevented from rotating. As with the first mode of operation, the brake units 38a,38b,38c,38d in the second mode of operation may remain activated when the driver of the vehicle 10 continues to press the brake pedal 46, such that the hydraulic control unit 34 actuates each of the brake units 38a,38b,38c,38d, or any combination of the brake units 38a,38b,38c,38d,38e,38f may remain activated automatically, where the ECU 36 actuates the parking brake units 38e,38f, or the ECU 36 commands the hydraulic control unit 34 to actuate one or more of the brake units 38a,38b,38c,38d once the dig system is activated.

The front wheels 28a,28b are then placed in a second configuration, as shown in FIG. 3, where the front wheels 28a,28b are turned to the left, and are positioned at a specified steering angle 62 as commanded by the driver of the vehicle 10, either by rotating the steering wheel 54 in the second direction 60, or when the driver of the vehicle 10 activates the dig system and a specific command is received from the driver of the vehicle 10 to place the front wheels 28a,28b in the second configuration (eliminating the need to rotate the steering wheel 54).

The ECU 36 then detects the wheels 28a,28b are in the second configuration, and configures the transfer case 16 such that power is no longer transferred to the rear wheels 32a,32b, and power from the engine 12 transferred only to the front wheels 28a,28b. The driver of the vehicle 10 is then notified by the indicator 58, that the dig system is active, and (if the brake pedal 46 has been applied) the brake pedal 46 is to be released. After the front wheels 28a,28b have been placed in the second configuration, the ECU 36 commands the hydraulic control unit 34 to release three of the brake units 38a,38b, and 38d (or 38f, depending on which of the brake units 38*d* or 38*f* were activated), and maintains the activation of the first rear brake unit 38*c* (or parking brake unit 38*e*) such that the first rear wheel 32*a* is still prevented from rotating.

Once the first rear brake unit 38*c* (or the parking brake unit 38*e*) is the only brake unit activated, the driver of the vehicle 10 then presses the accelerator pedal 44 such that power is transferred to the front wheels 28*a*,28*b*, causing the front wheels 28*a*,28*b* to rotate. The rotation of the front wheels 28*a*,28*b* rotates the vehicle 10 about the first axis 50, allowing the vehicle 10 to change direction without having to perform a back up or reverse maneuver. The amount the vehicle 10 pivots about the first axis 50 depends upon how long the driver of the vehicle 10 presses the accelerator pedal 44, and the steering angle 62 of the front wheels 28*a*,28*b*. If the driver of the vehicle 10 is aggressive during the second mode of operation, and the front wheels 28*a*,28*b* are rotated at a high rate of speed, the vehicle 10 may not only pivot about the axis 50, but also move across the ground such that the first rear wheel 32*a* slides across the ground, as the remaining wheels 28*a*,28*b*,32*b* rotate because of the front wheels 28*a*,28*b* being driving by the transfer case 16 and the second rear wheel 32*b* being allowed to rotate free. Once the desired amount of rotation about the first axis 50 is achieved, the accelerator pedal 44 is released, such that the vehicle 10 stops rotating about the axis 50. The driver of the vehicle 10 then deactivates the dig system by again pressing the button 48 (or buttons 68), or touches the brake pedal 46, where the ECU 36 then commands the hydraulic control unit 34 to release the first rear brake unit 38*c* (or the ECU 36 directly releases the parking brake unit 38*e*), such that all of the brake units 38*a*,38*b*,38*c*,38*d*,38*e*,38*f* return to functioning as expected when the dig system is inactive, and the transfer case 16 is configured such that the transfer case 16 transfers power to all four wheels 28*a*,28*b*,32*a*,32*b*.

The dig system also includes a third mode of operation and a fourth mode of operation used to perform a rear dig. In the third mode of operation, the accelerator pedal 44 is again released, and the brake pedal 46 is applied such that the vehicle 10 is not moving, and the driver of the vehicle 10 activates the dig system by pressing the button 48 (or buttons 68). Once the dig system is activated, the brake pedal 46 is released, and the front brake units 38*a*,38*b* and either the rear brake units 38*c*,38*d* or the parking brake units 38*e*,38*f* remain again activated such that each of the wheels 28*a*,28*b*,32*a*,32*b* is prevented from rotating. The front wheels 28*a*,28*b* are again placed in the first configuration, as shown in FIG. 2, where the front wheels 28*a*,28*b* are turned to the right, and are positioned at a specific steering angle 62 commanded by the driver of the vehicle 10.

The ECU 36 then detects the wheels 28*a*,28*b* are in the first configuration, and configures the transfer case 16 such that power is no longer transferred to the front wheels 28*a*,28*b*, and power from the engine 12 transferred only to the rear wheels 32*a*,32*b*. After the front wheels 28*a*,28*b* have been placed in the first configuration, the ECU 36 releases the parking brake units 38*e*,38*f* (if the parking brake units 38*e*,38*f* are activated), and commands the hydraulic control unit 34 to release all of the other brake units 38*a*,38*c*,38*d*, except the second front brake unit 38*b*, where the activation of the second front brake unit 38*b* is maintained such that the second front wheel 28*b* is still prevented from rotating.

Once the second front brake unit 38*b* is the only brake unit activated, the driver of the vehicle 10 then presses the accelerator pedal 44 such that power is transferred to the rear wheels 32*a*,32*b*, causing the rear wheels 32*a*,32*b* to rotate. The rotation of the rear wheels 32*a*,32*b* rotates the vehicle 10 about a fourth axis 66, again allowing the vehicle 10 to change direction without having to perform a back up or reverse maneuver. The amount the vehicle 10 pivots about the fourth axis 66 depends upon how long the driver of the vehicle 10 presses the accelerator pedal 44, and the steering angle 62 of the front wheels 28*a*,28*b*. If the driver of the vehicle 10 is aggressive, and the rear wheels 32*a*,32*b* are rotated at a high rate of speed, the vehicle 10 may not only pivot about the axis 66, but also move across the ground such that the second front wheel 28*b* slides across the ground, as the remaining wheels 28*a*,32*a*,32*b* rotate because of the rear wheels 32*a*,32*b* being driven by the transfer case 16 and the first front wheel 28*a* being allowed to rotate free. Once the desired amount of rotation about the fourth axis 66 is achieved, the accelerator pedal 44 is released, such that the vehicle 10 stops rotating about the axis 66. The driver of the vehicle 10 then deactivates the dig system by again pressing the button 48, or touches the brake pedal 46, where the ECU 36 then commands the hydraulic control unit 34 to release the second front brake unit 38*b*, such that all of the brake units 38*a*,38*b*,38*c*,38*d*,38*e*,38*f* return to functioning as expected when the dig system is inactive, and the transfer case 16 is configured such that the transfer case 16 transfers power to all four wheels 28*a*,28*b*,32*a*,32*b*.

In the fourth mode of operation, the accelerator pedal 44 is again released, and the brake pedal 46 is applied such that the vehicle 10 is not moving, and the driver of the vehicle 10 again activates the dig system by pressing the button 48 (or buttons 68). Once the dig system is activated, the brake pedal 46 is released, and the front brake units 38*a*,38*b* and either the rear brake units 38*c*,38*d* or the parking brake units 38*e*,38*f* remain activated such that each of the wheels 28*a*,28*b*,32*a*,32*b* is prevented from rotating. The front wheels 28*a*,28*b* are then placed in the second configuration, as shown in FIG. 3, where the front wheels 28*a*,28*b* are turned to the left, and are positioned at a specified steering angle 62 as commanded by the driver of the vehicle 10.

The ECU 36 then detects the wheels 28*a*,28*b* are in the second configuration, and configures the transfer case 16 such that power is no longer transferred to the front wheels 28*a*,28*b*, and power from the engine 12 transferred only to the rear wheels 32*a*,32*b*. After the front wheels 28*a*,28*b* have been placed in the second configuration, the ECU 36 releases the parking brake units 38*e*,38*f* (if the parking brake units 38*e*,38*f* are activated), and commands the hydraulic control unit 34 to release all of the other brake units 38*b*,38*c*,38*d* except the first front brake unit 38*a*, where the activation of the first front brake unit 38*a* is maintained such that the first front wheel 28*a* is still prevented from rotating.

Once the second front brake unit 38*b* is the only brake unit activated, the driver of the vehicle 10 then presses the accelerator pedal 44 such that power is transferred to the rear wheels 32*a*,32*b*, causing the rear wheels 32*a*,32*b* to rotate. The rotation of the rear wheels 32*a*,32*b* rotates the vehicle 10 about the third axis 64, again allowing the vehicle 10 to change direction without having to perform a back up or reverse maneuver. The amount the vehicle 10 pivots about the third axis 64 depends upon how long the driver of the vehicle 10 presses the accelerator pedal 44, and the steering angle 62 of the front wheels 28*a*,28*b*. If the driver of the vehicle 10 is aggressive, and the rear wheels 32*a*,32*b* are rotated at a high rate of speed, the vehicle 10 may not only pivot about the axis 64, but also move across the ground such that the first front wheel 28*a* slides across the ground, as the remaining wheels 28*b*,32*a*,32*b* rotate because of the rear wheels 32*a*,32*b* being driven by the transfer case 16 and the second front wheel 28*b* being allowed to rotate free.

Once the desired amount of rotation about the third axis 64 is achieved, the accelerator pedal 44 is released, such that the vehicle 10 stops rotating about the axis 64. The driver of the vehicle 10 then deactivates the dig system by again pressing the button 48 (or buttons 68), or presses the brake pedal 46, where the ECU 36 then commands the hydraulic control unit 34 to release the first front brake unit 38a, such that all of the brake units 38a,38b,38c,38d,38e,38f return to functioning as expected when the dig system is inactive, and the transfer case 16 is configured such that the transfer case 16 transfers power to all four wheels 28a,28b,32a,32b.

The dig system of the present invention also includes certain operational features to prevent damage to the components of the vehicle 10. One of these features includes the ECU 36 automatically deactivating the dig system after the vehicle 10 reaches a certain speed, or if the steering wheel 54 to rotated such that the front wheels 28a,28b are no longer in the first configuration or the second configuration. The dig system is also automatically deactivated if any one of the vehicle's velocity, steering wheel angle, or transfer case mode is unavailable, faulted, or unknown.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dig system, comprising:
a vehicle;
at least one front wheel being part of the vehicle;
at least one rear wheel being part of the vehicle;
a braking system being part of the vehicle, the braking system operable for selectively preventing the rotation of the at least one front wheel and the at least one rear wheel;
a transfer case being part of the vehicle, the transfer case operable for transferring power to the at least one front wheel and the at least one rear wheel;
a plurality of axes; and
an actuator operable for placing the dig system in a first mode of operation, a second mode of operation, a third mode of operation, and a fourth mode of operation;
wherein during the first mode of operation, the at least one front wheel is placed in a first configuration, the transfer case is configured to transfer power to the at least one front wheel and disconnect from the at least one rear wheel, and the braking system is configured to prevent rotation of the at least one rear wheel, such that when the at least one front wheel is rotated by the transfer case, the vehicle pivots about one of the plurality of axes extending through the at least one rear wheel, during the second mode of operation, the at least one front wheel is placed in a second configuration, the transfer case is configured to transfer power to the at least one front wheel and disconnect from the at least one rear wheel, and the braking system is again configured to prevent rotation of the at least one rear wheel, such that when the at least one rear wheel is rotated, the vehicle pivots about the one of the plurality of axes extending through the at least one rear wheel, during the third mode of operation, the at least one front wheel is placed in the first configuration, the transfer case is configured to transfer power to the at least one rear wheel and disconnect from the at least one front wheel, and the braking system is configured to prevent rotation of the at least one front wheel, such that when the at least one rear wheel is rotated by the transfer case, and the vehicle pivots about one of the plurality of axes extending through the at least one front wheel, during the fourth mode of operation, the at least one front wheel is placed in the second configuration, the transfer case is configured to transfer power to the at least one rear wheel and disconnect from the at least one front wheel, and the braking system is again configured to prevent rotation of the at least one front wheel, such that when the at least one rear wheel is rotated, the vehicle pivots about the one of the plurality of axes extending through the at least one front wheel.

2. The dig system of claim 1, further comprising:
a first front wheel rotationally driven by the transfer case; and
a second front wheel rotationally driven by the transfer case;
wherein during the first mode of operation, the first front wheel and the second front wheel are placed in the first configuration and are rotationally driven by the transfer case, during the second mode of operation, the first front wheel and the second front wheel are placed in the second configuration, and are rotationally driven by the transfer case, during the third mode of operation, the second front wheel is prevented from rotating by the braking system such that the vehicle pivots about one of the plurality of axes extending through the second front wheel, and during the fourth mode of operation, the first front wheel is prevented from rotating by the braking system such that the vehicle pivots about one of the plurality of axes extending through the first front wheel.

3. The dig system of claim 2, the braking system further comprising:
a first front brake unit operable for selectively preventing rotation of the first front wheel; and
a second front brake unit operable for selectively preventing rotation of the second rear wheel;
wherein during the first mode of operation and the second mode of operation, the first front brake unit and the second front brake unit are deactivated such that first front wheel and the second front wheel are rotated by the transfer case, during the third mode of operation, the first front brake unit is deactivated, and the second front brake unit is activated to prevent the rotation of the second front wheel, and during the fourth mode of operation, the second front brake unit is deactivated, and the first front brake unit is activated to prevent rotation of the first front wheel.

4. The dig system of claim 1, further comprising:
a first rear wheel rotationally driven by the transfer case; and
a second rear wheel rotationally driven by the transfer case;
wherein during the first mode of operation, the transfer case is disconnected from the first rear wheel and the second rear wheel, the braking system is configured to prevent the second rear wheel from rotating, such that the vehicle pivots about the one of the plurality of axes extending through the second rear wheel, during the second mode of operation, the transfer case is disconnected from the first rear wheel and the second rear wheel, the braking system is configured to prevent the first wheel from rotating such that the vehicle pivots about the one of the plurality of axes extending through the first rear wheel, and during the third mode of operation and the fourth mode of operation, the first rear wheel and the second rear wheel are rotationally driven by the transfer case.

5. The dig system of claim 4, the braking system further comprising:
a first rear brake unit operable for selectively preventing rotation of the first rear wheel; and
a second rear brake unit operable for selectively preventing rotation of the second rear wheel;
wherein during the first mode of operation, the first rear brake unit is deactivated, and the second rear brake unit is activated such that the second rear wheel is prevented from rotating, during the second mode of operation, the second rear brake unit is deactivated, and the first rear brake unit is activated such that the first rear wheel is prevented from rotating, and during the third mode of operation and the fourth mode of operation, the first rear brake unit and the second rear brake unit are deactivated.

6. The dig system of claim 5, the first rear brake unit further comprising a first parking brake unit.

7. The dig system of claim 5, the second rear brake unit further comprising a second parking brake unit.

8. A dig system, comprising:
a vehicle;
a first front wheel;
a second front wheel;
a front axle, the first front wheel and the second front wheel connected to the front axle;
a first rear wheel;
a second rear wheel;
a rear axle, the first rear wheel and the second rear wheel connected to the rear axle;
a transfer case for distributing power between the front axle and the rear axle;
a first front brake unit operable for selectively preventing rotation of the first front wheel;
a second front brake unit operable for selectively preventing rotation of the second front wheel;
a first rear brake unit operable for selectively preventing rotation of the first rear wheel;
a second rear brake unit operable for selectively preventing rotation of the second rear wheel;
a hydraulic control unit operable for controlling the first front brake unit, the second front brake unit, the first rear brake unit, and the second rear brake unit;
a first axis extending through the first rear wheel;
a second axis extending through the second rear wheel;
a third axis extending through the first front wheel;
a fourth axis extending through the second front wheel; and
an actuator operable for placing the dig system in a first mode of operation, a second mode of operation, a third mode of operation, and a fourth mode of operation;
wherein during the first mode of operation, the first front wheel and the second front wheel are placed in a first configuration, the hydraulic control unit releases the first front brake unit, the second front brake unit, and the first rear brake unit, and maintains the actuation of the second rear brake unit such that the second rear wheel is prevented from rotating, the transfer case is configured to transfer power to the first front wheel and the second front wheel, is disconnected from the first rear wheel and the second rear wheel, and the first front wheel and second front wheel are rotated such that the vehicle pivots about the second axis, during the second mode of operation, the first front wheel and second front wheel are placed in a second configuration, the hydraulic control unit releases the first front brake unit, the second front brake unit, and the second rear brake unit, and maintains the actuation of the first rear brake unit such that the first rear wheel is prevented from rotating, the transfer case is configured to transfer power to the first front wheel and the second front wheel, and is disconnected from the first rear wheel and the second rear wheel, and the first front wheel and second front wheel are rotated such that the vehicle pivots about the first axis, during the third mode of operation, the first front wheel and the second front wheel are placed in the first configuration, the transfer case is configured to transfer power to the first rear wheel and the second rear wheel, and disconnect from the first front wheel and the second front wheel, and the braking system is configured to prevent rotation of the second front wheel, such that when the first rear wheel and the second rear wheel are rotated by the transfer case, the vehicle pivots about the fourth axis extending through the second front wheel, and during the fourth mode of operation, the first front wheel and the second front wheel are placed in the second configuration, the transfer case is configured to transfer power to the first rear wheel and the second rear wheel and disconnect from the first front wheel and the second front wheel, and the braking system is configured to prevent rotation of first front wheel, such that when the first rear wheel and the second rear wheel are rotated, the vehicle pivots about the third axis extending through the first front wheel.

9. The dig system of claim 8, the first rear brake unit further comprising a first parking brake unit.

10. The dig system of claim 9, the second rear brake unit further comprising a second parking brake unit.

11. The dig system of claim 8, further comprising an actuator for controlling the operation of the dig system, wherein the actuator is used to configure the dig system in either of the first mode of operation, the second mode of operation, the third mode of operation, or the fourth mode of operation.

12. The dig system of claim 8, the first front wheel and the second front wheel are positioned at a desired steering angle when the first front wheel and the second front wheel are placed in either the first configuration or the second configuration.

13. A method of performing a dig maneuver, comprising the steps of:
providing a vehicle;
providing at least one front wheel being part of the vehicle;
providing at least one rear wheel being part of the vehicle;
providing a braking system being part of the vehicle, the braking system operable for selectively preventing the rotation of each of the at least one front wheel and the at least one rear wheel;
providing a transfer case being part of the vehicle, the transfer case operable for transferring power to the at least one front wheel and the at least one rear wheel;
providing a plurality of axes; and
providing an actuator operable for placing the dig system in a first mode of operation, a second mode of operation, a third mode of operation, and a fourth mode of operation;
placing the dig system in a first mode of operation such that the transfer case transfers power to the at least one front wheel and disconnects from the at least one rear wheel, the at least one front wheel is in a first configuration, and the braking system is configured to prevent rotation of the at least one rear wheel, such that when the at least one front wheel is rotated by the transfer case, the vehicle pivots about one of the plurality of axes extending through the at least one rear wheel;

placing the dig system in the second mode of operation such that the transfer case transfers power to the at least one front wheel and disconnects from the at least one rear wheel, the at least one front wheel is in a second configuration, and the braking system is configured to prevent the rotation of the at least one rear wheel, such that when the at least one front wheel is rotated, the vehicle pivots about the one of the plurality of axes extending through the at least one rear wheel;

placing the dig system in a third mode of operation such that the transfer case transfers power to the at least one rear wheel, and disconnects from the at least one front wheel, the at least one front wheel is in the first configuration, and the braking system is configured to prevent rotation of the at least one front wheel, such that when the at least one rear wheel is rotated by the transfer case, the vehicle pivots about one of the plurality of axes extending through the at least one front wheel;

placing the dig system in a fourth mode of operation such that the transfer case transfers power to the at least one rear wheel and disconnects from the at least one front wheel, the at least one front wheel is in the second configuration, and the braking system is configured to prevent rotation of the at least one front wheel, such that when the at least one rear wheel is rotated by the transfer case, the vehicle pivots about the one of the plurality of axes extending through the at least one front wheel.

14. The method of performing a dig maneuver of claim 13, further comprising the steps of:
providing the at least one front wheel to include a first front wheel rotationally driven by the transfer case; and
providing the at least one front wheel to include a second front wheel rotationally driven by the transfer case;
placing the first front wheel and the second front wheel in the first configuration, and rotating the first front wheel and the second front wheel using the transfer case, during the first mode of operation;
placing the first front wheel and the second front wheel in the second configuration, and rotating the first front wheel and the second front wheel using the transfer case during the second mode of operation;
placing the first front wheel and the second front wheel in the first configuration and configuring the braking system to prevent the second front wheel from rotating such that the vehicle pivot about one of the plurality of axes extending through the second front wheel during the third mode of operation;
placing the first front wheel and the second front wheel in the second configuration, and configuring the braking system to prevent the first front wheel from rotating such that the vehicle pivot about one of the plurality of axes extending through the first front wheel during the fourth mode of operation.

15. The method of performing a dig maneuver of claim 14, further comprising the steps of:
providing a first front brake unit operable for preventing rotation of the first front wheel, the first front brake unit being part of the braking system; and
providing a second front brake unit operable for preventing rotation of the second rear wheel, the second front brake unit being part of the braking system;
deactivating the first front brake unit and the second front brake unit during the first mode of operation and the second mode of operation such that first front wheel and the second front wheel are rotated by the transfer case;
activating the second front brake unit to prevent the second front wheel from rotating during the third mode of operation;
activating the first front brake unit to prevent the second front wheel from rotating during the fourth mode of operation.

16. The method of performing a dig maneuver of claim 13, further comprising the steps of:
providing the at least one rear wheel to include a first rear wheel rotationally driven by the transfer case; and
providing the at least one rear wheel to include a second rear wheel rotationally driven by the transfer case;
configuring the braking system to prevent the second rear wheel from rotating such that the vehicle pivots about one of the plurality of axes extending through the second rear wheel during the first mode of operation;
configuring the braking system to prevent the first rear wheel from rotating such that the vehicle pivots about the one of the plurality of axes extending through the first rear wheel during the second mode of operation;
configuring the braking system to allow the first rear wheel and the second rear wheel are allowed to be driven by the transfer case during the third mode of operation and the fourth mode of operation.

17. The method of performing a dig maneuver of claim 16, further comprising the steps of:
providing a first rear brake unit operable for preventing rotation of the first rear wheel, the first rear brake unit being part of the braking system; and
providing a second rear brake unit operable for preventing rotation of the second rear wheel, the second rear brake unit being part of the braking system;
releasing the first rear brake unit, and actuating the second rear brake unit such that the second rear wheel is prevented from rotating during the first mode of operation;
releasing the second rear brake unit, and actuating the first rear brake unit such that the first rear wheel is prevented from rotating and during the second mode of operation;
releasing the first rear brake unit and the second rear brake unit during the third mode of operation and the fourth mode of operation.

18. The method of performing a dig maneuver of claim 17, further comprising the steps of:
providing the first rear brake unit to be first parking brake unit;
providing the second rear brake unit to be a second parking brake unit;
releasing the first rear brake unit, and actuating the second rear brake unit such that the second rear wheel is prevented from rotating during the first mode of operation;
releasing the second rear brake unit, and actuating the first rear brake unit such that the first rear wheel is prevented from rotating and during the second mode of operation;
releasing the first rear brake unit and the second rear brake unit during the third mode of operation and the fourth mode of operation.

* * * * *